Jan. 5, 1971  H. REITER ET AL  3,552,118
CHAIN MAKING

Filed Dec. 4, 1967  9 Sheets-Sheet 1

INVENTORS
Hans Reiter
Robert Hannig
Heinrich Falkenrich
by Roderick W. Visser
attorney

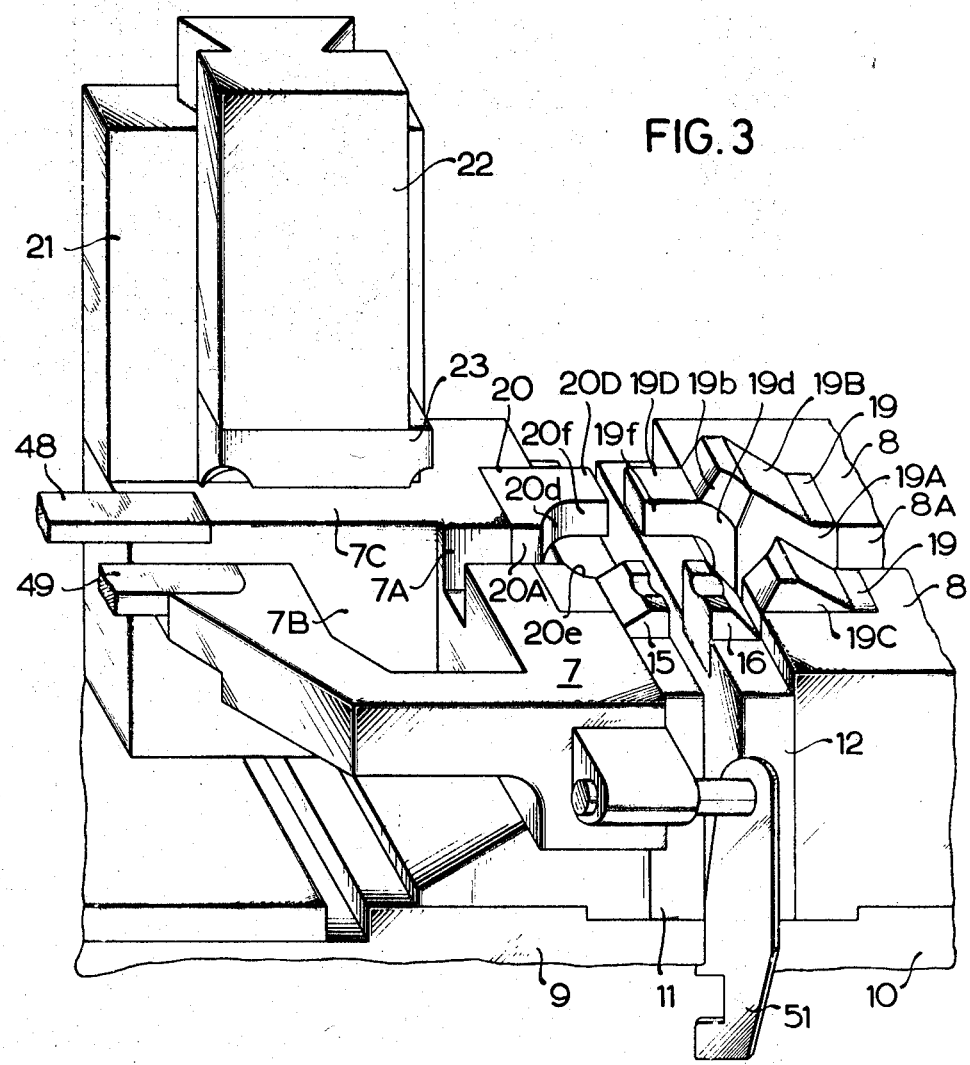

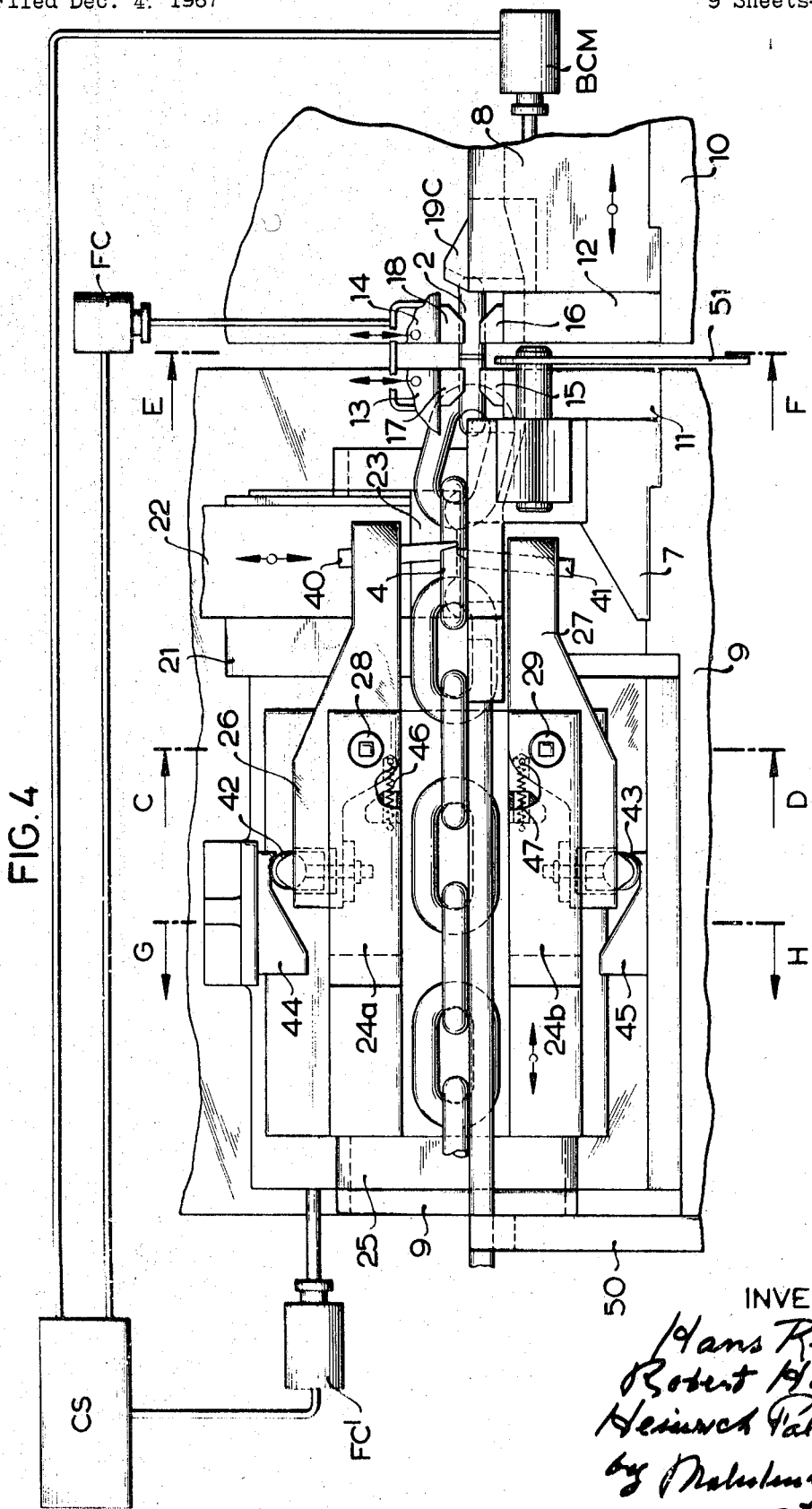

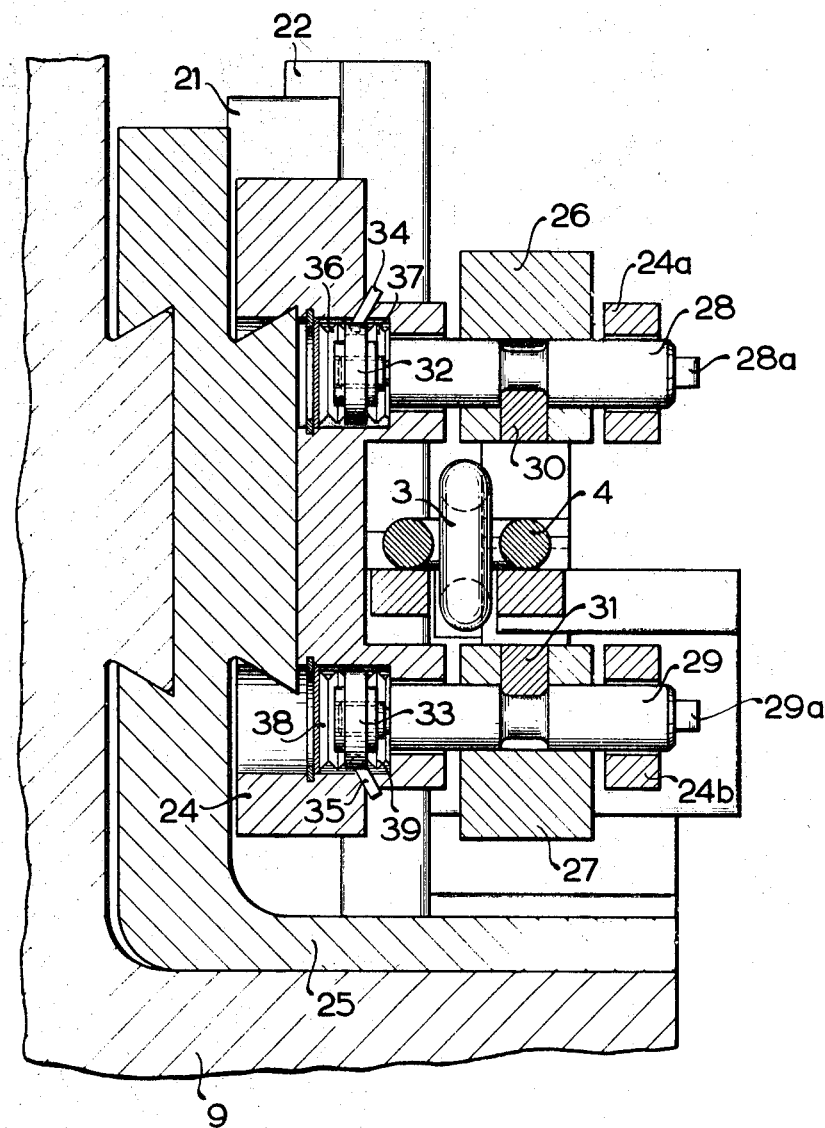

Jan. 5, 1971  H. REITER ET AL  3,552,118
CHAIN MAKING
Filed Dec. 4. 1967  9 Sheets-Sheet 6
FIG. 10
FIG. 11
FIG. 8
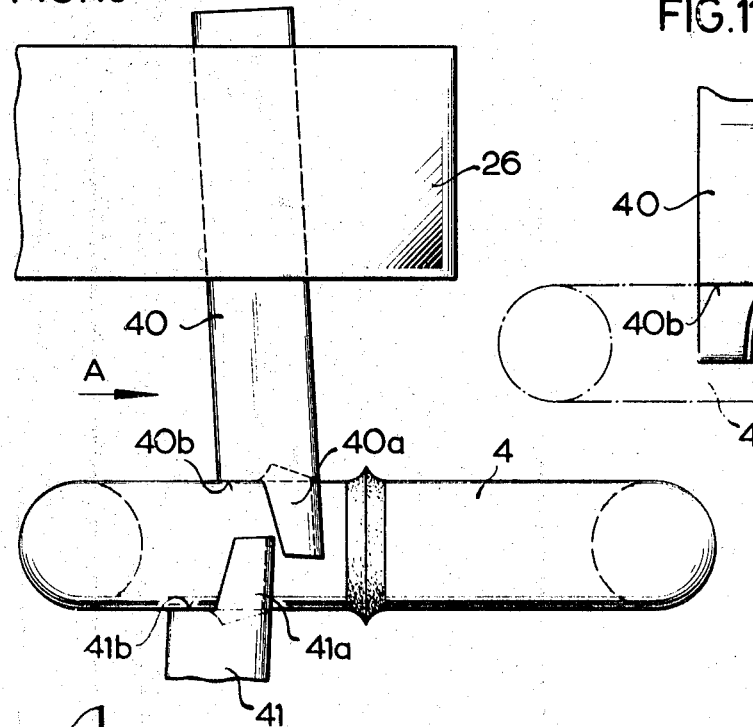
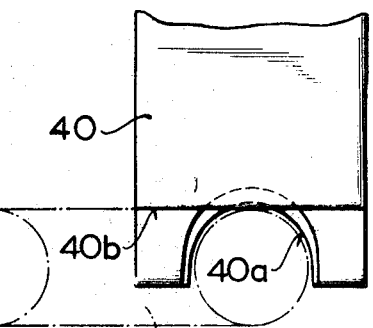
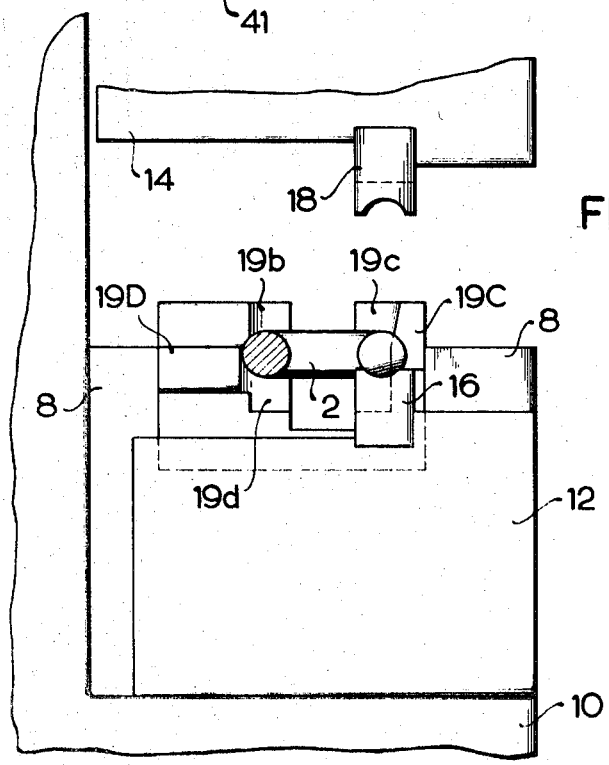
INVENTORS

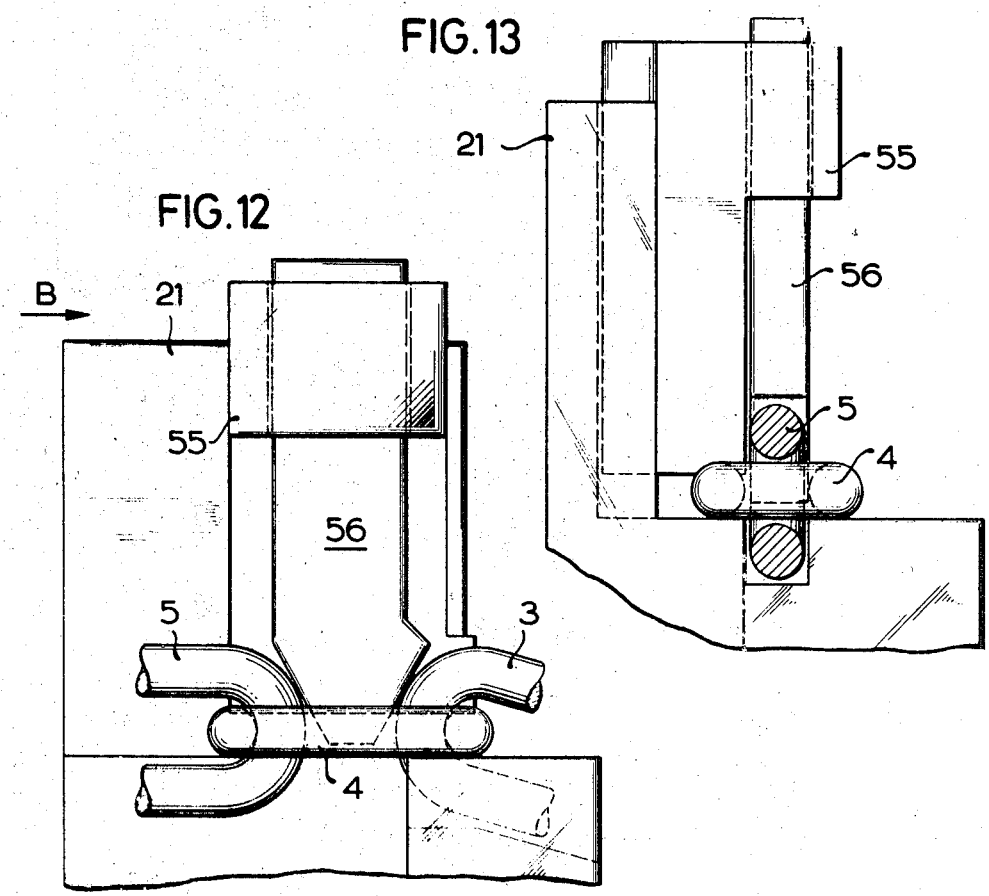
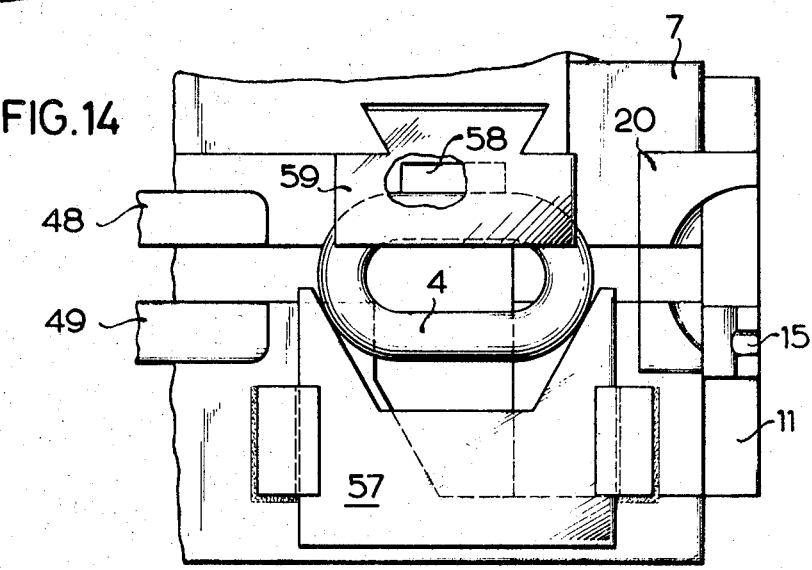

United States Patent Office 3,552,118
Patented Jan. 5, 1971

3,552,118
CHAIN MAKING
Hans Reiter, 23 Pestalozzistrasse; and Heinrich Hannig, 9 Arnoldstrasse, both of 4354 Datteln, Germany; and Heinrich Falkenrich, 5 Schottelkamp, 4351 Henrichenburg, Germany
Filed Dec. 4, 1967, Ser. No. 687,623
Claims priority, application Germany, Dec. 6, 1966,
B 90,154
Int. Cl. B21l 15/00
U.S. Cl. 59—29     17 Claims

ABSTRACT OF THE DISCLOSURE

A machine for automatically welding together the two ends of each open link of a round-link chain which connects two other links of the chain to each other, and simultaneously removing flash from the previously welded link. The link from which the flash is to be removed is clamped in position slightly before the link to be welded is clamped, thereby enabling a slight movement of the link to be welded toward the other link to provide slack. Thus, after all of the links in horizontal alinement have been welded and the flash removed therefrom, the shortened chain may again be passed through the machine with the links which were previously vertically alined arranged in horizontal alinement and these links are then welded and the flash removed, thereby completely welding the chain on the same machine.

BACKGROUND OF THE INVENTION

Basically, two welding processes are known for welding links, one constituting the welding of the links with arc welding and effecting concomitant of the weld and link. In the process, slag and welding cinder are unavoidably pressed into the weld, and as a consequence the strength of the chain is reduced. Due to the fact that the weld is pressed during the welding operation, considerable flash must be removed in the trimming operation.

The other welding process is the welding by sparks, and in this process a relatively larger part of the chain link is removed at the weld location. Thus, although a weld of improved strength is secured inasmuch as no slag or cinder remain in the weld, nevertheless the length of the chain is considerably reduced owing to the shortening of the links during the welding operation.

length of the chain has been shortened, it can again be passed through the machine to effect welding and flash removal of the other links.

A further object of the invention is to provide a chain welding machine which operates at a higher speed than known machines.

The present invention consists in a machine for welding a length of threaded machine links with limbs and curved end pieces connecting the limbs, comprising means for feeding the chain lengthways in steps along a feed path with its limbs alined with first and second mutually perpendicular planes intersecting along the axis of the feed path, means for welding the links, and means for removing weld flash, characterized in that the flash removing and welding means are arranged, respectively, at two separate stations, along the feed path, and in that the machine further comprises first and second means for positioning and gripping two horizontally alined links at welding and flash removing positions in the welding and flash removing stations with slack between these two links, welding taking place on one side of the vertically disposed link, and means for simultaneously operating the welding and flash removing means.

The feed path can be a straight horizontal line and the means for positioning and gripping one of the two links operates prior to the other clamping means so that the link to be welded is moved toward the other, thereby creating slack.

The invention also consists in a method of welding threaded chain links to form a chain, comprising feeding the unwelded chain links in steps along an axis with even links in a plane alined in a vertical plane and odd links alined in a horizontal plane, the two planes intersecting on the axis of movement, positioning two even links in a welding and a flash removing station, respectively, slack being produced between the two even links, simultaneously welding one such even link and removing flash from the other even link, moving the chain a further step along the axis, and removing red hot flash from the link just welded and welding a further even link.

In order that the advantages of a machine embodying the invention may be more readily understood a comparison is now made with a modern prior art machine, as described in the German patent specification 1,212,-396. The comparison is best made by means of a table. In the following table which has accordingly been drawn up, the time units are purely arbitrary and are somewhat approximate.

| | | Time in arbitrary units | | |
|---|---|---|---|---|
| | | | Invention | |
| Symbol | Operation | Prior art | Weld. stat. | Flash remov. |
| A | Automatic transport of chain through one step, to move welded units to flash removal station | 15 | 15 | 15 |
| B | Time for positioning and gripping links in welding and flash removing station | 15 | 15 | 15 |
| V | Overlap between A and B at flash removing station | | | −2 |
| $R_1$ | Idle time at flash removing station due to V | | | 2 |
| C | Welding | 50 | 50 | |
| D | Flash removal: | | | |
| | $d_1$ advance of knives and removal of part of flash | 15 | | |
| | $d_2$ swing of knives through 90° to remove rest of flash | 15 | | |
| | $d_3$ movement opposite to $d_2$ | 15 | | |
| | $d_4$ movement opposite to $d_1$ | 15 | | |
| | $d_5$ advance of knives along link limb and complete removal of flash | | | 15 |
| | $d_6$ return of knives | | | 15 |
| E | Release of links | 15 | 15 | 15 |
| $R_2$ | Idle time at flash removing station, due to more rapid flash removal than welding | | | 20 |
| Total | | 155 | 95 | 95 |

SUMMARY OF THE INVENTION

One object of the invention is to produce a welding machine for round-link chains in which welding and flash removal of alternate horizontally disposed links take place simultaneously in such manner that even though the In what follows the symbols used without a prime (') refer to the prior art construction and those with to a machine in accordance with the invention.

For the operating time (F) of the prior art machine we have $A+B+C+D+E=155$ time units.

For the time (F') in the machine in accordance with the invention we have:

for the welding station: $A'+B'+C'+E'$
for the flash removal station:

$$A'-V'+B'+R_1+D'+E+R_2$$

Welding and flash removal take place simultaneously and the duration is 95 time units.

The saving in time for each working step ($\Delta F$) is $F=F'=D=60$ time units, D denoting the flash removal time in the prior art construction.

Furthermore $E=d_1+d_2+d_3+d_4$ and $$E'=d'_5+d'_6=d_1+d_4$$

Subtracting we have $$E=E'=d_2+d_3=\Delta E$$

From this it follows that the economy in flash removal time with the machine in accordance with the invention is $$\Delta E=d_2+d_3$$

representing an economy of 50 percent approximately.

The occurrence of the idle time $R_2$ can be used for instance for shortening the welding step by pre-heating the links so that a further speeding up of the machine is possible.

Two principal advanages of the machine in accordance with the invention are:

(1) The relative movement together on positioning of the links to be welded and to have flash removed from them is such that slack is produced between them.
(2) The flash removing means enable any chain link, including the end link, to have flash removed from it while still hot. Furthermore the time for flash removal is substantially shorter than in the known construction despite the simpler construction.

BRIEF DESCRIPTION OF THE DRAWINGS

The invention will now be explained with reference to the accompanying drawings.

FIG. 3 is a perspective view of an apparatus in accordance with the invention showing the welding station and the gripping means of the flash removing station, some parts being removed.

FIG. 4 is a side view of the apparatus.

FIGS 7 to 9 are sections on the lines C–D, E–F, and G–H of FIG. 4.

FIG. 11 shows the flash removing knives acting on a chain link, from the side.

FIG. 11 is a view looking in the direction of the arrow A in FIG. 10.

FIGS. 12, 13, and 14 show particular forms of means for positioning a link in a horizontal direction for the flash removing station.

DESCRIPTION OF THE PREFERRED EMBODIMENT

Figure 1A:
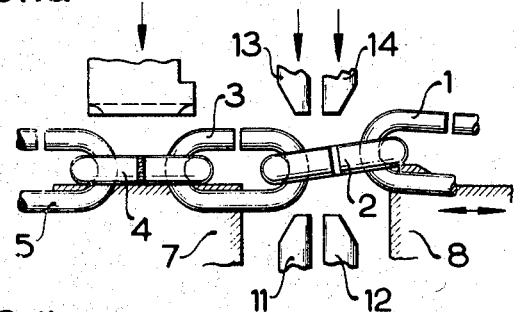
FIG. 1a and FIG. 1b show the passage of threaded chain links through welding and flash removing stations operating in accordance with the invention.
Figure 1B:
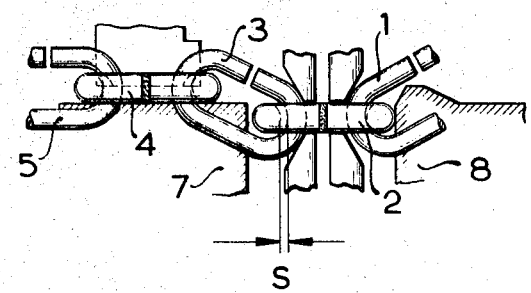

In the diagrammatic FIGS. 1a through 2b the chain is first moved along a horizontal line or axis with odd links 1, 3, and 5 alined with a vertical plane and even links 2 and 4 alined with a horizontal plane, the two planes intersecting along the axis. During a first passage through the apparatus of the invention, from right to left, the even links are welded at the welding station on the right and then have flash removed from them at the flash removing station on the left. For the second passage thorugh the apparatus the chain is turned about its axis and again passed through from right to left. Movement of the chain is carried out in steps equal to the spacing apart of alternate links. At the end of a feeding step the chain of threaded links is in the position according to FIG. 1a with a link 2 to be welded somewhat above the welding position and the link 4 which has just been welded in the flash removing station where it is to be positioned, by moving it in a horizontal plane, and gripped ready for flash removal. The positioning and gripping jaw of the flash removing station moves in a downward direction before the link 2 is positioned and positions and grips the link 4. Slightly before downward movement of the jaw is completed upper top holding means or upper gripping jaws 13 and 14 of the welding station begin to move downwards, respectively, toward the link 2 to be welded. The link is moved downwards and is caused to slide along the oblique faces of the righthand pinching jaw 8. This reduces the distance between the links 2 and 4 so that an amount of slack S is produced between the links. The intermediate link 3 assumes an oblique position and hangs loosely between the links 2 and 4. The slack denoted by S in FIG. 1b represents the value of the slack after gripping of the links. In the first passage of the chain through the apparatus this slack is greater than in the second passage because the odd link 3 is not yet welded.

Figure 2A:
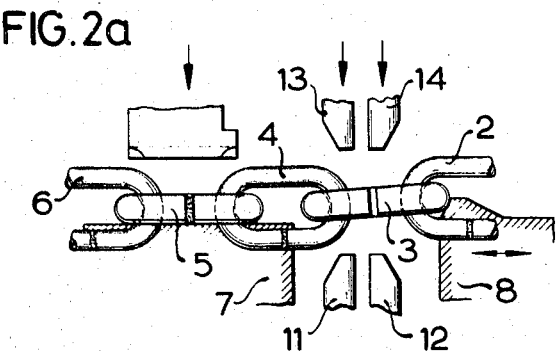
FIG. 2a and FIG. 2b show the second passage of the chain links through the welding and flash removing stations.
Figure 2B:
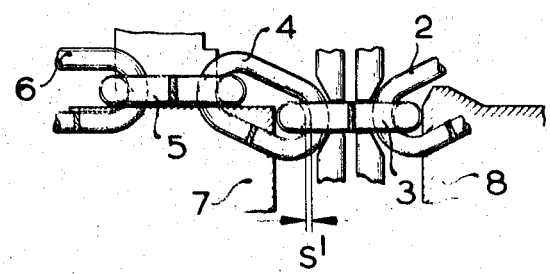

In the second passage of the chain shown in FIGS. 2a and 2b the odd links 3 and 5 are welded while the even ones 2, 4, and 6 have already been welded in the first passage. FIG. 2a shows the position of the links before positioning and gripping while FIG. 2b shows the gripped chain links. The positioning and gripping of the links occurs exactly as in FIGS. 1a and 1b except that the slack S' is smaller than the slack S, especially because the link 4 has become shorter owing to the welding in the first passage.

FIGS. 1a to 2b thus show the movement together of the links 2 and 4 in the one case, and 3 and 5 in the other with the resulting production of slack S and S' respectively, the slack S' being the smaller.

After these general explanations a specific embodiment of the invention will be described in the form of a flash butt welding machine.

Figure 5:
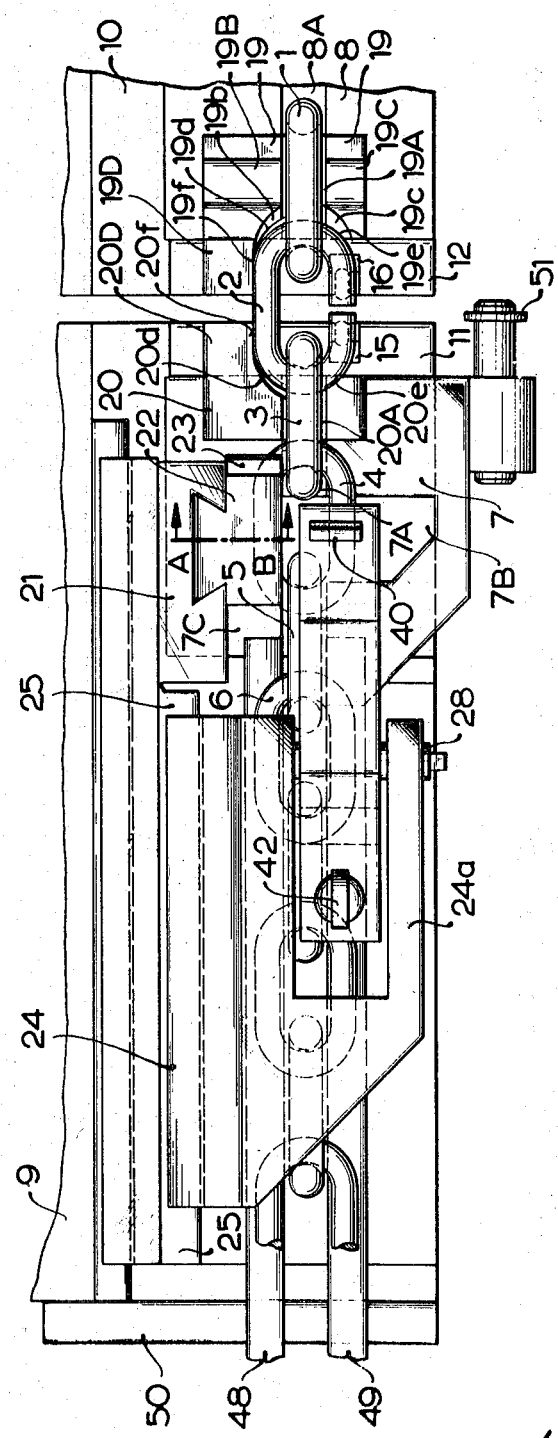
FIG. 5 is a plan view of the apparatus showing the welding and flash removing stations, the cam for the upper follower roller being omitted.
Figure 9:
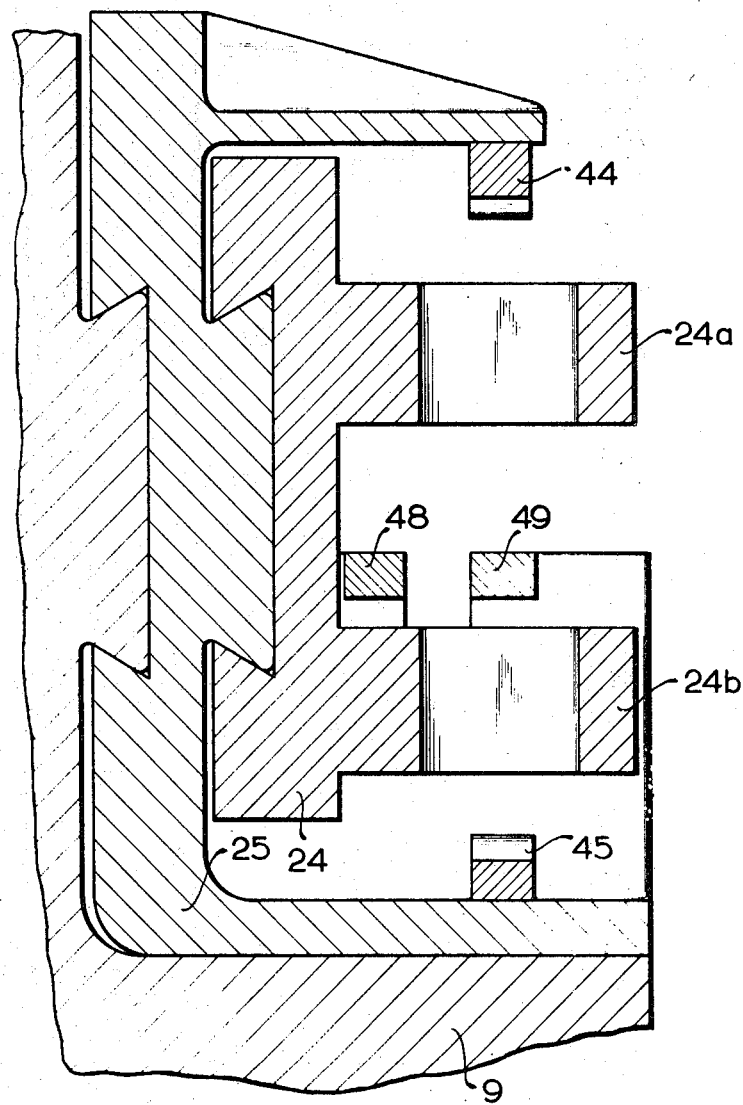
Figure 15:
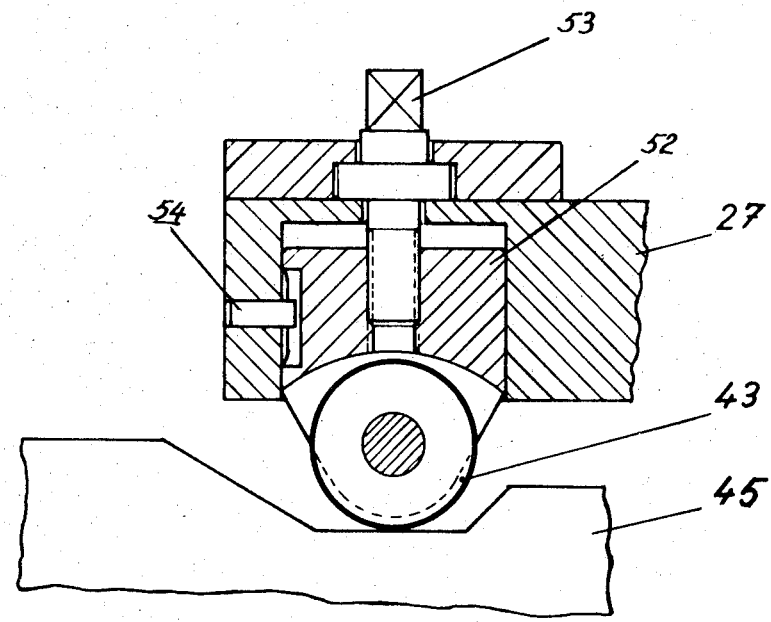
FIG. 15 is a fragmentary sectional view showing the adjustment of the roller by which the knife-carrying arms are adjusted for adjusting the position of the knives.

As shown in FIGS. 3, 4, and 5 the welding station has a lefthand pinching jaw 7 and a righthand pinching jaw 8 which serve to clamp the links for welding. The jaw 7 is fixed on a machine frame 9 and the jaw 8 is carried on a horizontally travelling pinching carriage 10. The machine frame 9 and the travelling carriage 10 further carry lower gripping jaws 11 and 12 and upper gripping jaws 13 and 14. Each of the four gripping jaws is provided with an electrode or contact piece 15–18 which can be replaced. Alternatively the contact pieces can be made integrally with the jaws. Both the stationary jaws 11 and 12 are arranged so that their height can be adjusted when the machine is not operating. This enables compensation for wear of electrodes 15 and 16. Adjustment as to height can be provided for by conventional means such as wedges, screws, or eccentrics.

In the righthand pinching jaw 8 there is mounted an abutment 19, see FIG. 3. Both the jaw 8 and the abutment 19 are provided with a vertically extending groove 8A, 19A for the passage of the vertically alined links such as 1, 3, and 5 in FIG. 1a. On the two sides of the groove 19A the abutment 19 has ramp surfaces 19B and 19C rising in the direction of travel of the links. Both ramp surfaces adjoin rounded inclined surfaces 19b and 19c, see FIGS. 3, 5, and 8, which are also inclined obliquely downwards and below the level of the ramps pass into the vertical rounded faces 19d and 19e. These surfaces on the righthand abutment and corresponding surfaces on the lefthand abutment, to be described, form a pocket for the link in which it is pinched and welded. The link to be welded is caused to slide in a downward direction over these faces by the electrodes or contact pieces 17 and 18 towards the stationary contact pieces 15 and 16, this movement also causing the link to be welded to move towards the link to have flash removed from it in the flash removing station. The vertical surface 19d does not come so close to the link as the vertical surface 19e and adjoins a vertical surface 19f on the projection 19D of the abutment 19. Thus the righthand half of the link 2 lies against the vertical faces 19e and 19f before welding so that more particularly during pinching of the link the face 19f on the projection 19D serves to prevent displacement or sliding out of position of the link. The abutment surfaces 19d and 19e encompass the link with different clearance relationships on one side of the vertical medium plane of the link different to those on the other so that only the limb of the link 2 abuts against the surface 19e and is pinched.

The lefthand pinching jaw 7 also has an abutment 20 mounted in it. For the passage of the vertical chain links such as 1, 3, and 5 as shown in FIG. 1a the jaw 7 has a vertical groove 7A and the abutment 20 has a vertical groove 20A. In contrast to the abutment 19 the abutment 20 has no ramp surfaces but it has the rounded vertical faces 20d and 20e and a projection 20D with the straight face 20f. Moreover, the face 20d does not come so close to the link as the surface 20e in order to pinch the link on the welding side of its vertical medium plane. The pinching jaw 7 has, on the left of its abutment 20, a recess 7B which is so dimensioned that the flash removing means has sufficient space for operation. Moreover, the remaining top horizontal surface 7C of the jaw 7 is arranged to serve as a counter abutment during gripping, as will be described in more detail below.

The flash removing station comprises a vertically moving gripping jaw which presses the links against the surface 7C. The jaw is attached to a base frame 25, see FIG. 4, which is carried on the machine frame 9 in such a manner as to allow adjustment in a horizontal direction parallel to the axis of the chain for adjustment for different chain link sizes. The actual gripping jaw is denoted by reference numeral 22 and is carried on a vertical guide 21 which in turn is carried in the frame 25. The jaw has a shaped removable cheek piece 23 which is provided with oblique surfaces 23a and 23b (see FIG. 6) which are capable of moving a link horizontally both in a direction perpendicular to the axis of the chain and also in a direction parallel to the axis for positioning of the link.

Figure 6:
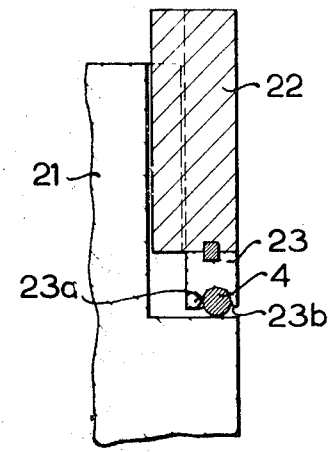
FIG. 6 is a section on the line A–B of FIGS. 4 and 5.

In accordance with a modification of the machine in accordance with the invention cheek pieces as shown in FIGS. 12, 13, and 14 can be used instead of the one shown in FIG. 6. In accordance with the form of cheek piece shown in FIGS. 12 and 13 there is a wedge-shaped part 56 carried on a jaw part 55 and serving for moving the link 4 in a direction parallel to the chain axis for positioning the chain. Before flash removal takes place the part 56 moves upwards again.

In accordance with the further embodiment shown in FIG. 14 a lateral positioning jaw 57 moves horizontally towards the chain axis pressing the link 4 against anvil or abutment 58 which is fixed to the lefthand pinching jaw 7. As a result the link to be welded is moved horizontally in a direction perpendicular to the chain axis so as to take up the correct position for flash removal. After such positioning the gripping jaw 59 moves downwards against the link without the jaw 57 being withdrawn.

As shown in FIGS. 4, 5, 7 and 9 the flash removing means includes a carriage 24 which is arranged for movement parallel to the chain axis and is mounted on the base frame. It is moved to the right for the removal of flash and then returned to its left-hand position. The frame 25 is, as already mentioned, connected with the machine frame 9 so as to allow adjustment in the horizontal direction for use with different chain pitches. The carriage 24 comprises two arms 24a and 24b (see especially FIGS. 5, 7, and 9) which extend horizontally perpendicular to the vertical plane of the chain. The flash removing means further comprise an upper knife carrying lever 26 and a lower knife carrying lever 27. Both levers are of the two-armed type, that is to say their pivot points, constituted by horizontal pins 28 and 29, are between their ends. The pins 28 and 29 in the levers 26 and 27 are provided with parts 30 and 31 (FIG. 7) for taking up play and preventing lateral displacement along the axes of the pins or twisting of the levers in relation to the axes of the pins, that is to say not about the axes of the pins. At one end each pin has a square head 28a and 29a by means of which it can be turned with a spanner. At the opposite ends the pins have screw threads by means of which they are held in bushes 32 and 33 which are prevented from turning by pins 34 and 35. Both bushes are resiliently held in the axial positions shown by means of spring elements 36, 37, and 38, 39 so that displacement of the levers in the axial direction of the pins is possible. The spring elements are preferably, as shown, in the form of Belleville washers; by turning the pins 28 and 29 by means of the square heads it is possible to move them and the levers carried on them in a horizontal direction perpendicular to the vertical plane of the chain since the pins screw in and out of the bushes 32 and 33. Such horizontal adjustment can be used for adapting the machine to different widths of chain links.

At their right-hand ends the levers 26 and 27 carry flash removing knives 40 and 41, respectively. Both knives have U-shaped cutting edges 40a and 41a (FIG. 10) with the limbs of the edges in vertical positions. Adjoining the rear faces of the knives there are guide faces parallel to the axis of the chain. These guide faces, denoted by reference numerals 40b and 41b in FIG. 10, are adjacent the cutting edges and run along the chain link limb during flash removal.

The other ends of the knife carrying levers 26 and 27 carry adjustable follower rollers 42 and 43 which run along cam surfaces 44, 45 of an angular profile which are fixed on the frame 25. The springs 46 and 47 serve to load the levers so as to hold them in engagement with the cam faces.

Each of the rollers 42 and 43 is adjustable. As shown on FIG. 12, the roller 43 is carried by a support block 52 which is shiftable in its socket by an adjusting screw 53, a stationary pin 54 extending into an elongate groove in the support block 52 preventing the latter from turning. Thus, the levers 26 and 27, which carry the knives 40 and 41 respectively, can be adjusted to effect lowering or removal of one or both knives from the chain link to be trimmed.

Within the carriage 24 there are two guide rails 48 and 49 (FIG. 9) along which the chain slides during feed movement in steps. The rails 48 and 49 are fixed on the left-hand pinching jaw 7 and on a plate 50 carried on the frame 9 (see also FIG. 5). In orded to prevent a link such as 2 which has just been welded from jamming in the welding position there is a lifting finger 51 which is carried on the left-hand pinching jaw 7.

The manner of operation of the machine is as follows:

The welding of, and flash removal from the links 1, 2, 3, 4, 5, and 6 of a chain of threaded links is carried out completely automatically. A chain feeding device, which can be of known construction and is therefore not shown in the drawing since its precise form is irrelevant for an understanding of the invention, moves the chain into the positions shown in FIGS. 4 and 5 with a link 4 which has just been welded and has red hot flash on it, into the flash removal station while a link 2 is in the welding station above the welding position. Shortly before the stepped feeding movement of the chain is completed, downward movement of the gripping jaw 22 of the flash removing station is started so that the link 4 from which flash is to be removed is positioned and gripped before the gripping jaws 13 and 14 of the welding station have gripped the link 2. The gripping jaws 13 and 14 are moved downwards by conventional means such as a fluid operated cylinder FC which is controlled from a central control station CS. Owing to the small lead in the operation of the gripping jaw 22 over the operation of the gripping jaws 13 and 14 the link 4 is positioned and gripped before the link 2 to be welded is pressed downwards along the downwardly inclined rounded faces 19b and 19c into the welding position or welding pocket defined by the surfaces 19e, 19f, and 20f and then gripped. Such movement moves the link 2 to be welded towards the link 4 from which flash is to be removed so that the slack S (FIG. 1) and the links 2 and 4 do not hinder each other during positioning and gripping. After both links have been positioned and gripped welding of link 2 and flash removal from link 4 begin immediately. Welding occurs in accordance with the welding control mechanism of the machine which can be of a type well-known to those in the art. For flash removal a U-shaped carriage 24 carried on the frame 25 is moved horizontally by means of a fluid operated cylinder FC' operated simultaneously by the control means CS with the butt welding control mechanism BCM which is responsible for moving the pinching jaw 8 and controlling the current supply to the electrodes 13, 14, 15, 16.

As the carriage is moved to the right the knives 40 and 41 come up against the link from which flash is to be removed so that their guide faces 40b and 41b come to rest against the link. The movement of the knives is controlled by the cam faces 44 and 45 against which the follower rollers 42 and 43 rest. The rollers can be finely adjusted for different sizes of link. When the knives 40 and 41 have successively removed the top and bottom parts of the flash as the carriage 24 (FIGS. 5-7) and both pass the position of the flash, the cylinder FC' is reversed together with the cylinder FC. All the gripping jaws 13, 14, and 22 return to their original positions and the lifting finger 51 is immediately operated to lift the link 2 just welded out of the welding position so that it cannot jam in the welding pocket and prevent feed of the chain. When such lifting has been completed the working cycle is repeated.

Various modifications may be made in the machine in accordance with the invention. For instance instead of both stations being horizontal, they can be set at an angle to each other.

What we claim is:

1. In a machine for welding together the two ends of a round-link chain connecting two other links of such chain to each other, in which the chain is advanced step by step with alternate links disposed in a horizontal plane and intermediate links disposed in a vertical plane, the improvement which comprises means to clamp the link to be welded in fixed position during the welding operation, means to clamp the link previously welded for flash removal, means for operating said second clamping means prior to operating said first clamping means to enable the latter to impart slight additional movement of the link to be welded relative to the adjacent link to provide slack therebetween, welding means, flash removal means, and means for simultaneously operating said welding means and flash removal means during the interval between the step by step movement.

2. A machine according to claim 1, further comprising two abutment means which form part of the positioning means of the welding station and have two abutment faces which are arranged to define a link-holding pocket, the abutment face for engaging the end of each link remote from the flash removing station being inclined towards the latter, and jaw means for moving the abutment means together in a direction parallel to the axis.

3. A machine according to claim 1, in which the welding position is at a lower level than the flash removing position.

4. A machine according to claim 2, in which the abutment means have grooves for the passage of links which are horizontally alined.

5. A machine according to claim 2, in which the abutment surfaces are arranged to encompass the links with a clearance between them and the vertically disposed link parts opposite the side on which welding takes place.

6. A machine according to claim 2, in which the abutment means have projections extending generally in the direction of the vertically disposed links on the side of the latter opposite to the welding side, the projections having link abutment faces generally parallel to the vertically disposed links.

7. A machine according to claim 2, in which that abutment means which is remote from the flash removing means defines ramp surfaces rising in the direction of travel of the links, and joining inclined surfaces running towards the welding pocket in the abutment means.

8. A machine according to claim 2, comprising a pivoting finger for lifting the chain out of the pocket.

9. A machine according to claim 1, in which the clamping means, serving for gripping and positioning links at the flash removal station, have oblique surfaces arranged to slide against the links and to move them in two directions parallel to the horizontal links.

10. A machine according to claim 1, further comprising: a carriage which is arranged for movement parallel to the axis, and has arms extending in a direction generally parallel to the horizontal links and perpendicular to the vertical links; two levers which pivot on the arms about axis perpendicular to the vertical links; and carry knife means for removing flash on the links in the flash removing station.

11. A machine according to claim 10, further comprising cam follower means on the levers, cam means arranged to be contacted by the follower means, for causing the levers to swing towards and away from each other on two opposite sides of the link as the carriage moves parallel to the axis, and means for adjusting the distance apart of the knife means.

12. A machine according to claim 11, comprising, as the cam follower means, adjustable rollers mounted on the levers.

13. A machine according to claim 11, further comprising spring means for urging the knife means apart.

14. A machine according to claim 11, in which the knife means have U-shaped cutting edges with the limbs of each U parallel to the vertical links and have guide faces parallel to the axis for making sliding guiding contact with the links.

15. A machine according to claim 11, having support rails which lie inside the carriage and are parallel to the axis and serve for guiding the chain links.

16. In a machine for chain welding according to claim 1, in which said flash removal comprises a carriage moveable parallel to the axis of the chain; arms on said carriage extending parallel to a vertical plane passing through the axis of the chain and perpendicular to a horizontal plane which intersects the vertical plane along the chain axis, two levers forming knife carriers rockable about axes perpendicular to the vertical plane, knives carried at the ends of said levers, cam follower means on said levers, cam means engageable by said follower means for swinging said levers toward and away from each other during carriage movement, and means for adjusting the knives relative to each other.

17. In a machine for chain welding according to claim 16, comprising a U-shaped cutting edge on each knife, and a relatively straight guide face adjacent each cutting edge and disposed parallel to the axis of the chain for making sliding guiding contact with the chain links.

References Cited

UNITED STATES PATENTS 3,389,552  6/1968  Kleine-Weischede _____ 59—29

FOREIGN PATENTS 1,212,396  3/1966  Germany.
427,469   6/1967  Switzerland.

CHARLES W. LANHAM, Primary Examiner
G. P. CROSBY, Assistant Examiner

U.S. Cl. X.R.

59—31